US012380810B2

(12) United States Patent
Hampton et al.

(10) Patent No.: US 12,380,810 B2
(45) Date of Patent: Aug. 5, 2025

(54) INTERACTIVE DEVICE ENCLOSING A HIDDEN PRIZE

(71) Applicant: Disney Enterprises, Inc., Burbank, CA (US)

(72) Inventors: John C. Hampton, Orlando, FL (US); Amanda T. Rubinos Luna, Orlando, FL (US); Brad L. Schoeneberg, Orlando, FL (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 18/381,048

(22) Filed: Oct. 17, 2023

(65) Prior Publication Data

US 2025/0124809 A1  Apr. 17, 2025

(51) Int. Cl.
G09B 19/00  (2006.01)

(52) U.S. Cl.
CPC .................... G09B 19/00 (2013.01)

(58) Field of Classification Search
CPC ....... G09B 19/00; G07C 9/00; G06Q 30/0201
See application file for complete search history.

(56) References Cited

U.S. PATENT DOCUMENTS

| 8,226,493 | B2 | 7/2012 | Briggs et al. | |
| 9,320,976 | B2 | 4/2016 | Weston | |
| 9,827,502 | B2 | 11/2017 | Leyland et al. | |
| 11,052,309 | B2 | 7/2021 | Barney et al. | |
| 2010/0056285 | A1 | 3/2010 | Weston et al. | |
| 2013/0238392 | A1* | 9/2013 | Sloan | G06Q 30/0207 705/7.29 |
| 2018/0214785 | A1 | 8/2018 | Hornsby et al. | |
| 2020/0139233 | A1 | 5/2020 | Weston et al. | |
| 2022/0020240 | A1* | 1/2022 | Zito, Jr. | G07F 9/00 |

FOREIGN PATENT DOCUMENTS

EP  0953369 A1  11/1999

OTHER PUBLICATIONS

Judith Amores, Xavier Benavides, Roger Boldu, Pattie Maes "Exploring the Design of a Wearable Devise to Turn Everyday Objects into Playful Experiences" CHI'15 Extended Abstracts, Apr. 18-23, 2015 Seoul, Republic of Korea 6 Pgs.
"MagiQuest: Embark on Magical Quests Throughout the Lodge" 2024 Great Wolf Resorts, 4 Pgs.
Kai Ekdal, Olivier Lauzon, Maria Diment, Dustan Grant, Will Lewis "RFID Treasure Hunt" Algonquin College, Mar. 25, 2021 2 Pgs.
"Interactive Wizarding Wands & Spell-Casting in the Wizarding World—Complete Guide" Orlando Informer, Oct. 9, 2023 22 pgs.

* cited by examiner

Primary Examiner — Timothy A Musselman
(74) Attorney, Agent, or Firm — Farjami & Farjami LLP

(57) ABSTRACT

A device for use by a user includes a power source, a compartment enclosing a prize, a transceiver powered by the power source, the transceiver configured to receive data identifying a progress by the user toward a completion of an activity, and a progress indicator powered by the power source, the progress indicator configured to display the progress by the user toward the completion of the activity, in accordance with the received data. The transceiver is further configured to receive additional data indicating the completion of the activity by the user. The device is configured to open the compartment enclosing the prize, in response to the transceiver receiving the received additional data indicating the completion of the activity by the user.

20 Claims, 4 Drawing Sheets

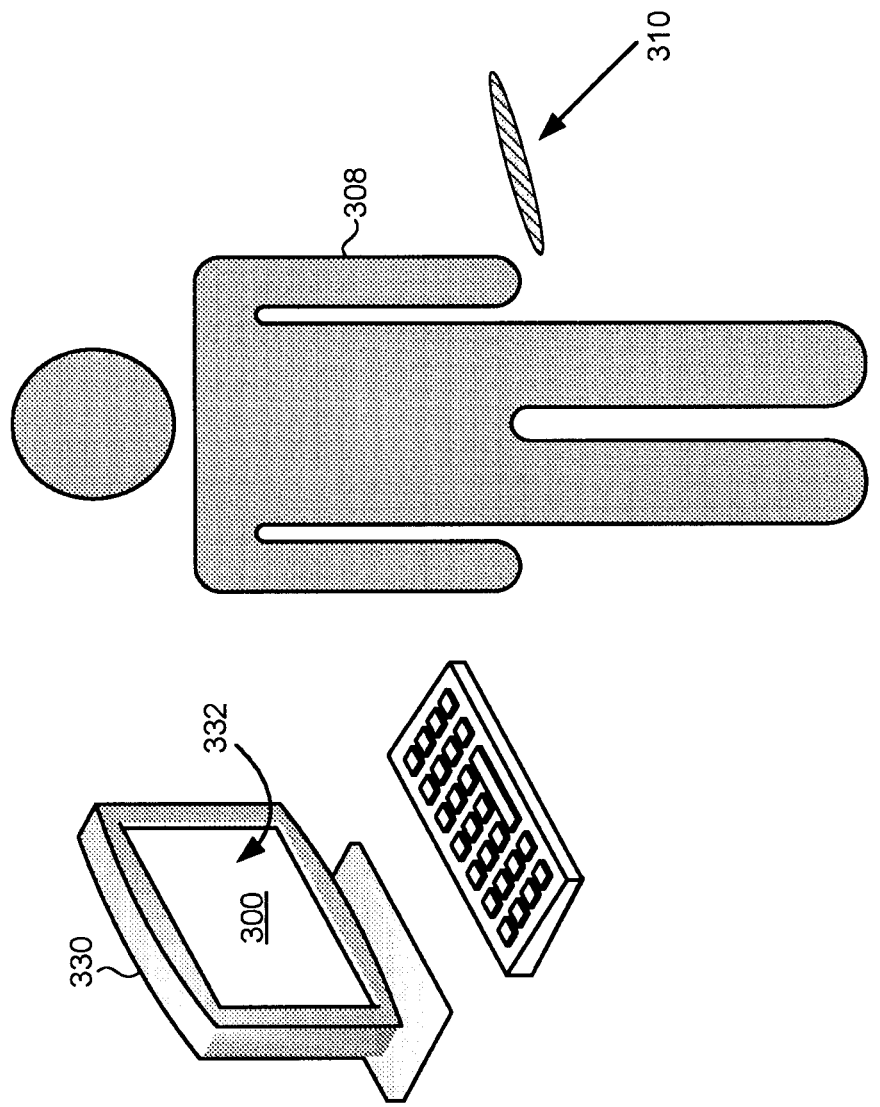

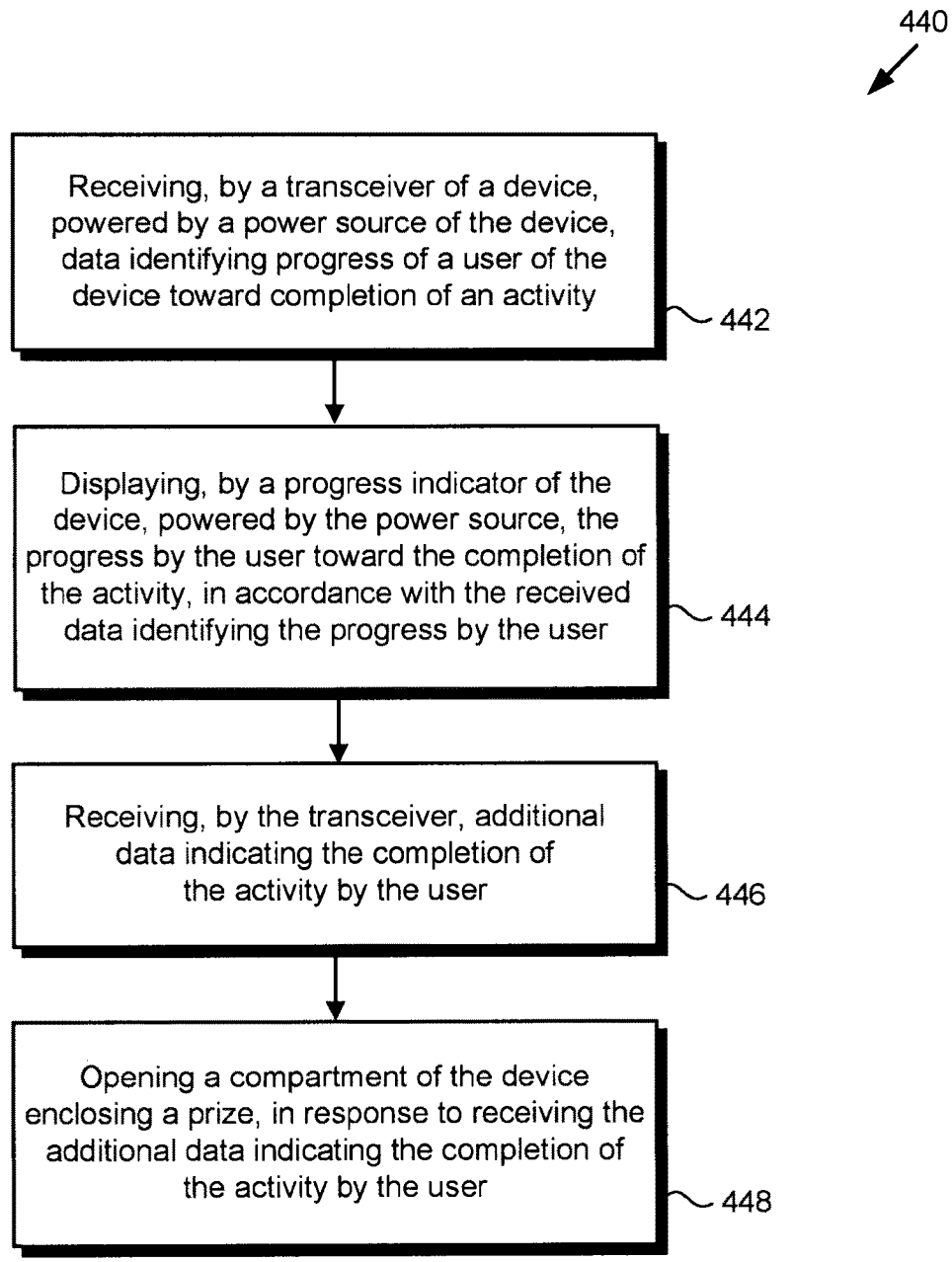

INTERACTIVE DEVICE ENCLOSING A HIDDEN PRIZE

BACKGROUND

In order to retain their appeal to users, consumer products must periodically evolve in ways that offer users new experiences through use of those products. One potential evolutionary path for an otherwise well-known type of consumer product is to imbue it with certain interactive features that incentivize participation in or completion of a desirable activity. For example, such an interactive consumer product could be used by a parent at home to encourage an uncooperative child to spend more time reading a book, or to complete a heretofore neglected homework assignment. Other possible use cases include educational settings in which an interactive product such as a toy or consumer electronics device could be used to encourage a student to complete a project in a subject the student finds challenging or unenjoyable, or to encourage a shy or introverted student to take part in group activities.

BRIEF DESCRIPTION OF THE DRAWINGS

FIG. 3 depicts a user utilizing an interactive device enclosing a hidden prize while engaging in an activity requiring the user to interact with a virtual venue, according to one implementation; and FIG. 4 shows a flowchart outlining an exemplary method of using an interactive device enclosing a hidden prize, according to one implementation.

DETAILED DESCRIPTION

Figure 1:
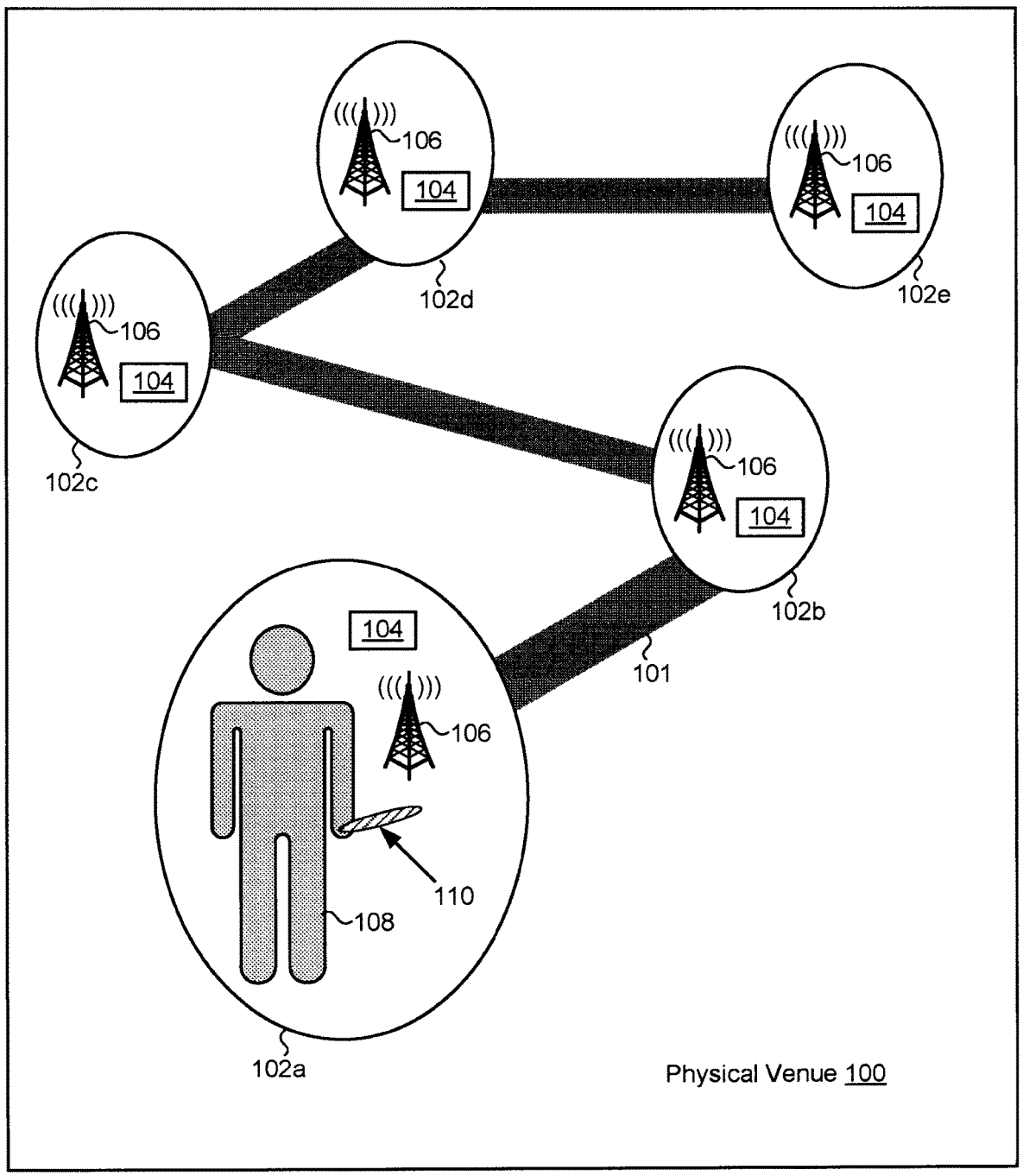
FIG. 1 shows a diagram of an exemplary physical venue in which a user utilizes an interactive device enclosing a hidden prize while engaging in an activity, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale and are not intended to correspond to actual relative dimensions.

The present application discloses interactive devices enclosing a hidden prize and methods for their use. It is noted that although implementations of the interactive device enclosing the hidden prize are described below in detail by reference to objects that may be characterized as toys or souvenirs, those representations are provided merely by way of example. In various use cases, such an interactive device may take the form of a toy, a collectible item or other souvenir, a consumer electronics device, or a wearable item such as a bracelet, locket or necklace, badge, or pin, or may include an augmented reality (AR) or virtual reality (VR) viewer for example.

It is further noted that, in some implementations, the interactive devices disclosed by the present application may be substantially or fully automated. As used in the present application, the terms "automation," "automated," and "automating" refer to systems and processes that do not require the participation of a human device operator. Thus, the methods described in the present application may be performed under the control of hardware processing components of the disclosed interactive devices.

As noted above, in order to retain their appeal to users, consumer products must periodically evolve in ways that offer users new experiences through use of those products. One potential evolutionary path for an otherwise well-known type of consumer product is to imbue it with certain interactive features that incentivize participation in or completion of a desirable activity. For example, and as also noted above, such an interactive consumer product could be used by a parent at home to encourage an uncooperative child to spend more time reading a book, or to complete a heretofore neglected homework assignment. Other possible use cases include educational settings in which an interactive product such as a toy or consumer electronics device could be used to encourage a student to complete a project in a subject the student finds challenging or unenjoyable, or to encourage a shy or introverted student to take part in group activities.

Thus, the present application discloses a device with interactive features that supports a quest or other purpose driven play style with a hidden prize within the device itself that is unlocked when the quest or other activity is completed. The interactive device may include for producing lights and sounds. The toy includes a transceiver or other reader/sensor mechanism that operates to recognize when a user of the interactive device has completed the quest or activity, or some stage of a multi-part quest or activity. For example, such recognition or progress by the user may result from communicating with a radio-frequency identification (RFID) touchpoint, infrared (IR) or radio beacon, scanning a quick-response (QR) code, or scanning an image or receiving audio signals.

The user may be assigned an activity with one or more stages that must be completed, where completion is recognized by appropriate response by the interactive device, such as the display of light and color, or the generation of an audio output that indicates progress by the user toward completion of the activity. Upon completion of the activity, interactive device unlocks a compartment enclosing a hidden prize, making that hidden prize available to the user. The hidden prize might be a tangible asset such as a toy or collectible, may be an entitlement to digital media content or an experience such as a movie, live show, theme park ride, video game session, or any combination thereof. In addition, or alternatively, the hidden prize may take the form of a QR code or alphanumeric code redeemable by the user of the interactive device to obtain a tangible asset, entitlement, or both, or may allow for purchase of a another item, such as a specialty item that may also be an interactive item. Moreover, the type of hidden prize may vary across different interactive devices, different activities, as well as over time, to encourage repeated participation by the user in the various purpose driven activities associated with the interactive devices.

FIG. 1 shows a diagram of exemplary physical venue 100 in which human user 108 (hereinafter "user 108") utilizes interactive device 110 enclosing a hidden prize while engaging in an activity, according to one implementation. As shown in FIG. 1, physical venue 100 includes multiple destinations 102a, 102b, 102c, 102d, and 102e (hereinafter "destinations 102a-102e") joined by path, trail, or route 101. As further shown in FIG. 1, each of destinations 102a-102e may include a respective interactive feature 104, as well as a respective transmitter 106.

Physical venue 100 may be an indoor venue, an outdoor venue, or a venue having indoor locations as well as outdoor locations. Examples of indoor venues include a hotel or other building, a shopping mall, a private residence, and the interior of a cruise ship, to name a few. Examples of indoor venues include a theme park, resort property, an open air shopping mall, and deck areas of a cruise ship, again to name a few. Thus, an open air shopping mall and a cruise ship are specific examples of physical venues including both indoor locations and outdoor locations.

As noted above interactive device 110 enclosing a hidden prize may take the form of a portable item such as a toy, collectible item or other souvenir, or a consumer electronics device, or may be a wearable item such as a bracelet, locket or necklace, badge, or pin or may include an AR or VR viewer for example. According to the exemplary implementation shown in FIG. 1, user 108 may utilize interactive device 110 in the course of participating in an activity that requires user 108 to be present at each of destinations 102a-102e in order to complete the activity. In addition, in some implementations that activity may require user 108 to engage with one or more of interactive features 104. For example, where interactive feature 104 is a theme park ride, parade, or live or recorded performance, the activity in which user 108 is engaged may require user 108 to ride the ride or attend the parade or performance. Alternatively, interactive feature 104 may be or include a display screen displaying instructions to be followed by user 108, or may be another type of stand-alone interactive feature requiring an input from user 108 or providing an output for user 108.

As user 108 travels path, trail, or route 101 to visit each of destinations 102a-102e, and interacts with one or more of interactive features 104, interactive device 110 receives data from transmitter 106 identifying progress by user 108 toward completion of the activity. Transmitter 106 may be configured to transmit communications using one or more of Wireless Fidelity (Wi-Fi®), Worldwide Interoperability for Microwave Access (WiMAX®), Bluetooth®, Bluetooth® low energy (BLE), ZigBee®, RFID, near-field communication (NFC), and 60 GHz wireless communications methods, for example.

As shown and described in greater detail below by reference to FIGS. 2A and 2B, interactive device 110 includes a progress indicator configured to display the progress by user 108 toward the completion of the activity, in accordance with the received data identifying the progress by user 108. For example, in one implementation, completion of each stage of the activity may be celebrated with one or more of light, sound, and haptic effects generated by interactive device 110. Moreover, the status indicator may persistently illuminate a lighting element, such as different colored lighting elements, for each stage of the activity completed, or may include a progress bar, or a display screen showing a percentage or numerical value corresponding to the progress by user 108 toward completion of the activity.

Upon completion of the activity, interactive device 110 may receive additional data indicating the completion of the activity by user 108, whereupon interactive device 110 is configured to open the compartment enclosing the prize. It is noted that in various implementations, the activity to be completed by user 108 using interactive device 110 may take a variety of forms, and may include attendance requirements, iterative requirements, and temporal requirements. For example, according to various versions of the exemplary implementation shown in FIG. 1, user 108 may be required to be present at each of destinations 102a-102e during the same visit to physical venue 100, may be required to visit physical venue 100 on at least two different occasions, or may be required to visit multiple different physical venues, one of which is physical venue 100.

Figure 2A:
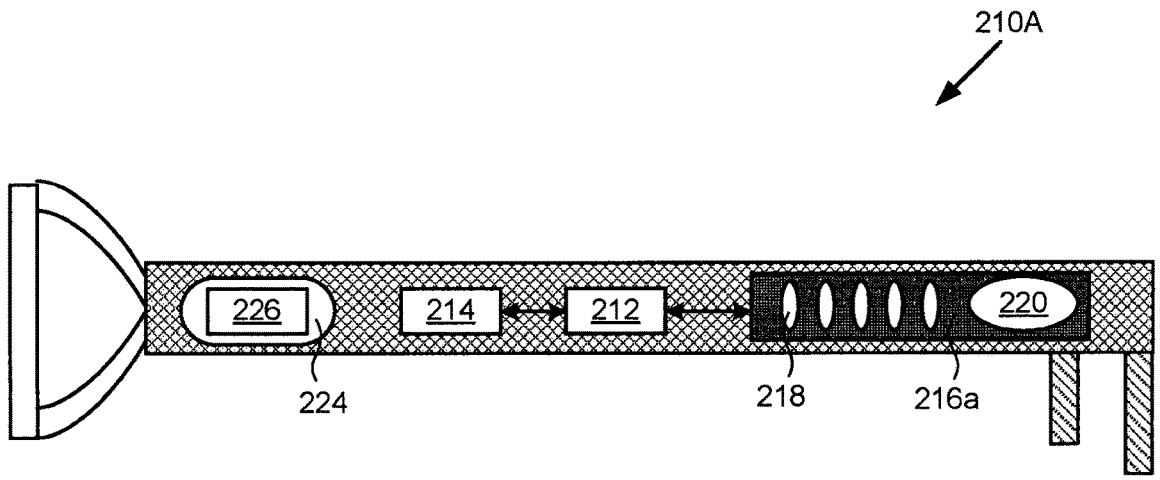
FIG. 2A shows an exemplary interactive device enclosing a hidden prize, according to one implementation.

FIG. 2A shows exemplary interactive device 210A enclosing a hidden prize, according to one implementation. According to the exemplary implementation shown in FIG. 2A, interactive device 210A is depicted as a portable collectible device in the form of a key, which may measure approximately twelve to fourteen inches (12-14 in.) in length, for example. Interactive device 210A includes power source 212, transceiver 214 powered by power source 212, and progress indicator 216a also powered by power source 212. According to the exemplary implementation shown in FIG. 2A, progress indicator 216a includes multiple lights 218, which may be illuminated using different colors for example, to indicate the progress of a user of interactive device 210A toward completion of an activity. For example, a different one of multiple lights 218 of progress indicator 216b may be illuminated and remain illuminated during the remainder of an activity as each stage of the activity is completed.

In addition, progress indicator 216a includes one or more additional output features 220 (hereinafter "output feature(s) 220"), which may include one or more of audio speakers or haptic actuators. As further shown in FIG. 2A interactive device 210A also includes compartment 224 enclosing hidden prize 226. It is noted that compartment 224 encloses and shields hidden prize 226 from the view of a user of interactive device 210A until the activity engaged in by the user is completed, whereupon interactive device 210A is configured to open compartment 224 to enable the user to obtain prize 226.

Power source 212 may take the form of a replaceable battery, or a rechargeable battery capable of providing substantially uninterrupted power for interactive device 210A. Transceiver 214 may be implemented as a wireless communication unit configured for use with one or more of a variety of wireless communication protocols. For example, transceiver 236 may include a 4G wireless transceiver and/or a 5G wireless transceiver. In addition, or alternatively, transceiver 236 may be configured for communications using one or more of Wi-Fi®, WiMAX®, Bluetooth®, BLE, ZigBee®, RFID, NFC, and 60 GHz wireless communications methods.

As noted above, hidden prize 226 might be a tangible asset such as a toy or collectible, may be an entitlement to digital media content or an experience such as a movie, live show, theme park ride, video game session, or any combination thereof. In addition, or alternatively, hidden prize 226 may take the form of a QR code or alphanumeric code redeemable by the user of interactive device 210A to obtain a tangible asset, entitlement, or both.

Interactive device 210A enclosing hidden prize 226 corresponds in general to interactive device 110, in FIG. 1, and those corresponding features may share any of the characteristics attributed to either corresponding feature by the present disclosure. Thus, although not shown in FIG. 1, interactive device 110, like interactive device 210A, may include features corresponding respectively to power source 212, transceiver 214, progress indicator 216a, and compartment 224 enclosing hidden prize 226.

Figure 2B:
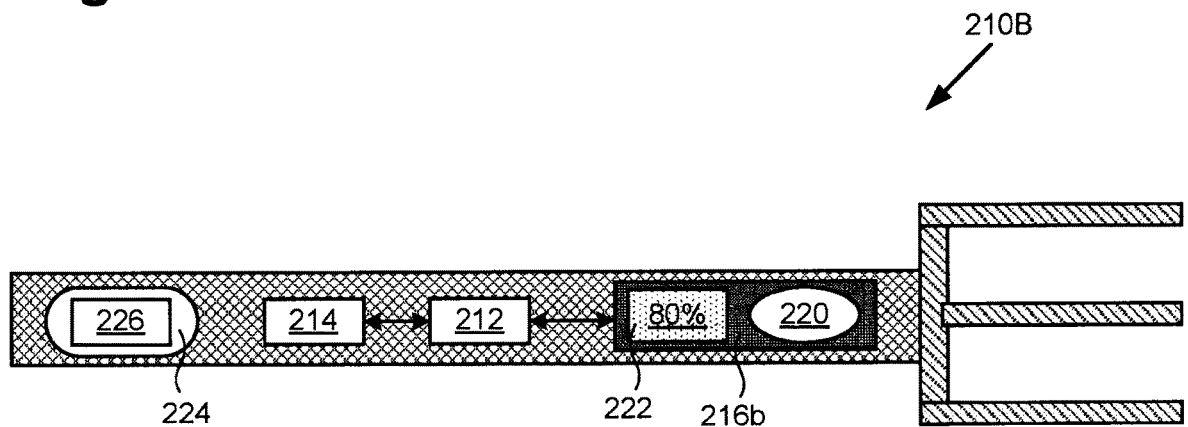
FIG. 2B shows an exemplary interactive device enclosing a hidden prize, according to another implementation.

FIG. 2B shows exemplary interactive device 210B enclosing hidden prize 226, according to another implementation. It is noted that any feature of interactive device 210B identified by a reference number also appearing in FIG. 2A corresponds respectively to the feature described by reference to FIG. 2A and may share any of the characteristics attributed to that feature above. Interactive device 210B is distinguishable from interactive device 210A in that interactive device 210B is in the form of a portable trident, while interactive device 210A takes the form of a key. In addition, progress indicator 216a of interactive device 210A includes multiple lights 218, while progress indicator 216b of interactive device 210B omits lights 218 but includes display screen 222 showing the progress of a user of interactive device 210B toward completion of an activity as a percentage of the activity presently completed, e.g., in the case of FIG. 2B, eighty percent (80%) completed.

It is noted that display screen 222 may take the form of a liquid crystal display (LCD), light-emitting diode (LED) display, organic light-emitting diode (OLED) display, quantum dot (QD) display, or any other suitable display screen that perform a physical transformation of signals to light. Interactive device 210B enclosing hidden prize 226 corresponds in general to interactive device 110, in FIG. 1, as well as to interactive device 210A, in FIG. 2A, and those corresponding features may share any of the characteristics attributed to either corresponding feature by the present disclosure. Thus, although not shown in FIG. 1, interactive device 110, like interactive device 210B, may include features corresponding respectively to power source 212, transceiver 214, progress indicator 216b, and compartment 224 enclosing hidden prize 226.

FIG. 3 depicts user 308 utilizing interactive device 310 enclosing a hidden prize while engaging in an activity requiring the user to interact with virtual venue 300, according to one implementation. As shown in FIG. 3, user 308 interacts with virtual venue 300 via user system 330 having display 332.

Virtual venue 300 may be or include a video game environment, or may include digital representations that populate a VR, an AR, or a mixed reality (MR) environment. That is to say, in some implementations virtual venue 300 may include digital representations of persons, fictional characters, locations, objects, and identifiers such as brands and logos, which populate a VR, AR, or MR environment. In some implementation, virtual venue 300 may depict virtual worlds that can be experienced by any number of users synchronously and persistently, while providing continuity of data such as personal identity, user history, entitlements, possessions, payments, and the like. Moreover, in some implementations virtual venue 300 may include content that is a hybrid of traditional audio-video and fully immersive VR/AR/MR experiences, such as interactive video.

Interactive device 310 corresponds in general to interactive device 110, in FIG. 1, as well as to interactive devices 210A and 210B, in FIGS. 2A and 2B. Thus, interactive device 310 may share any of the characteristics attributed to any of interactive devices 110, 210A, or 210B by the present disclosure, and vice versa. Consequently, although not shown in FIG. 3, interactive device 310 may include features corresponding respectively to power source 212, transceiver 214, progress indicator 216a or 216b, and compartment 224 enclosing hidden prize 226.

It is noted that, although user system 330 is shown as a desktop computer in FIG. 1, that representation is provided merely by way of example. In other implementations, user system 330 may take the form of any suitable mobile or stationary computing device or system that implement data processing capabilities sufficient to provide a user interface, support connections to a communication network, and implement the functionality ascribed to user system 330 herein. In other implementations, user system 330 may take the form of a smartphone, smart television (smart TV), laptop computer, tablet computer, digital media player, game console, or a wearable communication device such as a smartwatch, AR device, or VR device (e.g., headset). It is further noted that display 332 may take the form of an LCD, LED display, OLED display, QD display, or any other suitable display screen that perform a physical transformation of signals to light.

According to the exemplary implementation shown in FIG. 3, user 308 is in possession of interactive device 310 in the course of participating in an activity that requires user 308 to be visit specific locations in virtual venue 300, engage in interactions with virtual characters populating virtual venue 300, complete certain tasks within virtual venue 300, or any combination thereof, in order to complete the activity. Referring to FIGS. 2A, 2B, and 3 in combination, as user 308 interacts with virtual venue 300 while engaging in the activity, transceiver 214 of interactive device 310 receives data identifying progress by user 308 toward completion of the activity. It is noted that in various implementations, interactive device 310 may receive the data identifying the progress by user 308 toward completion of the activity from user system 330, or from a backend system hosting virtual venue 300 (backend system not shown in FIG. 3.) In implementations in which the data is received by interactive device 310 from user system 330, that data may be received via a direct wireless communication link with user system 330, such as a Bluetooth®, BLE, ZigBee®, RFID, NFC, or 60 GHz wireless communication link, via a local area network (LAN) connection, or via a packet-switched network such as the Internet.

As shown and described by reference to FIGS. 2A and 2B, interactive device 310 includes progress indicator 216a or 216b configured to display the progress by user 308 toward the completion of the activity, in accordance with the received data identifying the progress by user 308. For example, in one implementation, completion of each stage of the activity may be celebrated with one or more of light generated by multiple lights 218, an image or images displayed on display screen 222, or sound or haptic effects generated by output feature(s) 220. Moreover, status indicator 216a may persistently illuminate one of multiple lights 218, each having a different color for example, for each stage of the activity completed, or may include a progress bar, or display screen 222 showing a percentage or numerical value corresponding to the progress by user 308 toward completion of the activity.

Upon completion of the activity, interactive device 310 may receive additional data indicating the completion of the activity by user 308, whereupon interactive device 310 is configured to open compartment 224 enclosing prize 226. It is noted that in various implementations, the activity to be completed by user 308 may take a variety of forms, and may include attendance requirements, iterative requirements, and temporal requirements. For example, according to various versions of the exemplary implementation shown in FIG. 3, user 308 may be required to be present at each of multiple locations in virtual venue 300 during a single interactive session by user 308 with virtual venue 300, may be required to interact with virtual venue 300 on at least two different occasions, or may be required to interact with multiple different virtual venues, one of which is virtual venue 300.

The functionality of interactive device 110/210A/210B/310 in FIGS. 1, 2A, 2B, and 3 will be further described by reference to FIG. 4. FIG. 4 shows flowchart 440 outlining an exemplary method of using an interactive device enclosing a hidden prize, according to one implementation With respect to the method outlined in FIG. 4, it is noted that certain details and features have been left out of flowchart 440 in order not to obscure the discussion of the inventive features in the present application.

Referring to FIG. 4 in combination with FIGS. 1, 2A, 2B, and 3, the method outlined by flowchart 440 includes receiving data identifying a progress by user 108/308 toward completion of an activity (action 442). As noted above by reference to FIG. 1, in implementations in which the activity engaged in by user 108 requires user 108 to be present in physical venue 100, the data received in action 442 may be received from one or more transmitters 106 located respectively at one or more destinations 102a-102e within physical venue 100. As further noted above by reference to FIG. 3, in implementations in which the activity engaged in by user 308 requires user 308 to interact with virtual venue 300, the data received in action 442 may be received from user system 330, via a direct wireless communication link or a network communication link, or from a backend system hosting virtual venue 300 via a network communication link. Referring to FIGS. 2A and 2B, Action 442 may be performed using transceiver 214 of interactive device 210A or 210B, powered by power source 212 of interactive device 210A or 210B.

Continuing to refer to FIGS. 1, 2A, 2B, 3, and 4 in combination, the method outlined by flowchart 440 further includes displaying the progress by user 108/308 toward the completion of the activity, in accordance with the data identifying the progress by user 108/308 received in action 442 (action 444). Action 444 may be performed using progress indicator 216a or 216b of respective interactive device 210A or 210B, powered by power source 212 of interactive device 210A or 210B, as described in detail above by reference to FIGS. 2A and 2B.

Continuing to refer to FIGS. 1, 2A, 2B, 3, and 4 in combination, the method outlined by flowchart 440 further includes receiving additional data indicating completion of the activity by user 108/308 (action 446). As noted above, in implementations in which the activity engaged in by user 108/308 requires user 108/308 to be present in physical venue 100, the additional data received in action 446 may be received from one or more transmitters 106 located within physical venue 100. As further noted above, in implementations in which the activity engaged in by user 108/308 requires user 108/308 to interact with virtual venue 300, the additional data received in action 446 may be received from user system 330, via a direct wireless communication link or a network communication link, or from a backend system hosting virtual venue 300 via a network communication link. Action 446 may be performed using transceiver 214 of interactive device 210A or 210B, powered by power source 212 of interactive device 210A or 210B.

Continuing to refer to FIGS. 1, 2A, 2B, 3, and 4 in combination, the method outlined by flowchart 440 further includes opening compartment 224 enclosing prize 226, in response to receiving the additional data indicating the completion of the activity by user 108/308 (action 448). In various implementations, compartment 224 may enclose prize 226 using a spring-loaded or magnetically controlled closure, while in other implementations the opening of compartment 224 may result from the action of a small servo motor. Opening of compartment 224 enclosing prize 226, in action 448, may be performed using power source 212 of interactive device 210A or 210B, and rewards user 108/308 for completing the activity by enabling user 108/308 to obtain prize 226.

With respect to the method outlined by flowchart 440, it is noted that actions 442, 444, 446, and 448 may be performed in an automated process. Moreover, it is further noted that although in some implementations, flowchart 440 may conclude with action 448 described above, in other implementations it may be advantageous or desirable to enable re-use of interactive device 110/210A/210B/310 in conjunction with the same or a different activity by user 108/308. In those implementations, after compartment 224 enclosing prize 226 is opened in action 448, compartment 224 may be configured to be re-filled with a second prize and to enclose the second prize.

Thus, the present application discloses interactive devices enclosing a hidden prize and methods for their use. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the implementations described are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A portable user device for use by a user, the portable user device comprising:
    a power source;
    a compartment enclosing a prize;
    a transceiver powered by the power source, the transceiver configured to receive data identifying a progress by the user toward a completion of an activity;
    a progress indicator powered by the power source, the progress indicator configured to display the progress by the user toward the completion of the activity, in accordance with the received data identifying the progress by the user; and
    wherein the transceiver is further configured to receive additional data indicating the completion of the activity by the user;
    wherein the portable user device is configured to open the compartment enclosing the prize, in response to the transceiver receiving the received additional data indicating the completion of the activity by the user.

2. The portable user device of claim 1, wherein the portable user device is one of a wearable item or a toy.

3. The portable user device of claim 1, wherein the prize comprises one of a tangible asset or an entitlement.

4. The portable user device of claim 1, wherein the prize comprises one of a quick-response (QR) code or an alphanumeric code redeemable by the user to obtain a tangible asset or an entitlement.

5. The portable user device of claim 1, wherein the activity requires the user to be present in a physical venue.

6. The portable user device of claim 5, wherein the physical venue is one of a family residence, a theme park, a resort property, or a cruise ship.

7. The portable user device of claim 1, wherein the activity requires at least one of: (i) the user to be present in a same physical venue on at least two different occasions, or (ii) the user to visit a plurality of different physical venues.

8. The portable user device of claim 1, wherein the activity requires the user to interact with a virtual venue.

9. The portable user device of claim 8, wherein the virtual venue comprises at least one of a video game or digital representations that populate a virtual reality, an augmented reality, or a mixed reality environment.

10. The portable user device of claim 1, wherein after the compartment enclosing the prize is opened, the compartment is configured to be re-filled with a second prize and enclose the second prize.

11. A method of using a portable user device by a user, the portable user device including a power source, a transceiver, a progress indicator, and a compartment enclosing a prize, the method comprising:
receiving, by the transceiver powered by the power source, data identifying a progress by the user toward a completion of an activity;
displaying, by the progress indicator powered by the power source, the progress by the user toward the completion of the activity, in accordance with the received data identifying the progress by the user;
receiving, by the transceiver, additional data indicating the completion of the activity by the user; and
opening the compartment enclosing the prize, in response to receiving the additional data indicating the completion of the activity by the user.

12. The method of claim 11, wherein the portable user device is one of a wearable item or a toy.

13. The method of claim 11, wherein the prize comprises one of a tangible asset or an entitlement.

14. The method of claim 11, wherein the prize comprises one of a quick-response (QR) code or an alphanumeric code redeemable by the user to obtain a tangible asset or an entitlement.

15. The method of claim 11, wherein the activity requires the user to be present in a physical venue.

16. The method of claim 15, wherein the physical venue is one of a family residence, a theme park, a resort property, or a cruise ship.

17. The method of claim 11, wherein the activity requires at least one of: (i) the user to be present in a same physical venue on at least two different occasions, or (ii) the user to visit a plurality of different physical venues.

18. The method of claim 11, wherein the activity requires the user to interact with a virtual venue.

19. The method of claim 18, wherein the virtual venue comprises at least one of a video game or digital representations that populate a virtual reality, an augmented reality, or a mixed reality environment.

20. The method of claim 11, wherein after the compartment enclosing the prize is opened, the compartment is configured to be re-filled with a second prize and enclose the second prize.

* * * * *